United States Patent [19]

Schultz

[11] 4,204,043

[45] May 20, 1980

[54] METHOD OF REMOVING PIGMENT FROM ANNATTO SEED

[75] Inventor: William G. Schultz, El Cerrito, Calif.

[73] Assignee: The United States of America as represented by the Secretary of Agriculture, Washington, D.C.

[21] Appl. No.: 893,366

[22] Filed: Apr. 4, 1978

[51] Int. Cl.² .......................... A23L 1/27; A23L 1/28
[52] U.S. Cl. .................................... 435/267; 426/44; 426/50; 426/63; 426/540; 426/630; 426/429; 426/430; 8/438
[58] Field of Search .............. 426/250, 540, 429, 430, 426/63, 44, 50, 49, 630; 195/2; 8/58, 80; 435/267

[56] References Cited

U.S. PATENT DOCUMENTS

| | | | |
|---|---|---|---|
| 2,815,287 | 12/1957 | Barnett | 426/430 |
| 2,831,775 | 4/1958 | Kocher | 426/540 |
| 2,861,891 | 11/1958 | Bauernfeind et al. | 426/540 |
| 2,873,193 | 2/1959 | Cleland et al. | 195/2 |
| 3,162,538 | 12/1964 | Todd | 426/540 |
| 3,248,301 | 4/1966 | Burdick | 195/2 |
| 3,274,072 | 9/1966 | Burdick | 195/2 |
| 3,274,073 | 9/1966 | Burdick | 195/2 |
| 3,336,141 | 8/1967 | Frisina | 426/540 |
| 3,783,099 | 1/1974 | Matoushek | 195/2 |

*Primary Examiner*—Jeanette M. Hunter
*Attorney, Agent, or Firm*—M. Howard Silverstein; David G. McConnell; Theodore J. Leitereg

[57] ABSTRACT

Pigment is extracted from seeds containing the same by contacting the seeds with water containing one or more alpha-enzymes for a period of time and at a temperature sufficient to extract the pigment. In particular, annatto pigment can be extracted from the seeds of *Bixa orellana* L. by the aforementioned process.

9 Claims, No Drawings

METHOD OF REMOVING PIGMENT FROM ANNATTO SEED

BACKGROUND OF THE INVENTION

1. Field of the Invention

This invention relates to and has among its objects the provision of novel methods for extracting pigment from seeds containing the same, e.g., seeds of *Bixa orellana* L. (Lipstick Pod). It is a particular object of the invention to realize a high yield of pigment and to obtain seed which may be utilized as an animal feed after extraction of pigment therefrom. Further objects of the invention will be evident from the following description wherein parts and percentages are by weight unless otherwise specified.

2. Description of the Prior Art

The shrub *Bixa orellana* L. (Lipstick Pod) is native to tropical America and can be grown in moist climates such as in the tropical Americas, the Caribbean, East Africa, India, Pacific basin, Hawaii, Florida, etc. The plant and dye are known by various names, such as achiote (through much of Latin America), loa (Somoa), urucu (Brazil), and various other names such as roucou, onoto, bija, orlean, etc. The plant is large and quick-growing and produces clusters of pods, which, after drying, burst open to yield numerous small seeds. The plant is used both as an ornamental and as a source of pigment. The bright crimson outer covering of these seeds contains annatto, a natural pigment. After extraction from the seed covering, annatto is concentrated and used as a food coloring material for butter, cheese, chocolate, etc. The primary pigment in annatto is bixin; a yellow-red, carotenoid-type compound; in low concentration the annatto is yellow. Annatto is noncarcinogenic and, being a natural pigment, currently plays, and will continue to play, a prominent role as a food colorant.

Pigment is extracted from the seed of Lipstick Pod by a number of conventional procedures summarized in the *East African Agricultural and Forestry Journal*, Vol. 32, No. 2, pp. 126–132 (1966). Perhaps the oldest method involves leaching the seeds with either cold or hot water under agitating conditions. The pigment slurry is decanted and after boiling off excess water, an annatto paste is collected. This method has the disadvantages of being time-consuming, inefficient, and can cause deterioration of the pigment.

In another approach the seeds are washed with dilute aqueous alkali followed by water to yield a dark red solution, which is screened and acidified. The precipitated annatto pigment is collected, washed, and dried. The caustic extraction method has the advantage of extracting a large portion of the pigment in the seed. There are certain disadvantages associated with the alkaline extraction method. Alkali must be employed, thus necessitating a neutralization step to precipitate the solid dye. Furthermore, seed treated with caustic cannot be used directly as a poultry or animal feed, but first must be treated with acid to adjust the pH to an acceptable point.

Numerous solvent extractions are employed to extract the pigment from the seed. For example, Lipstick Pod seeds may be treated with edible oils, alkaline glycols, or volatile solvents, such as ethanol, acetone, trichloroethylene, etc., to extract pigment therefrom. After extraction is completed, the solvent is removed by distillation. These solvent extraction methods are expensive because of the quantity of solvent and elaborate equipment necessary for carrying out the extraction and distillation procedures and do not lend themselves to cottage-type industry or to farm level processing, customary in rural and undeveloped areas.

SUMMARY OF THE INVENTION

The invention described herein provides means for obviating the problems mentioned above. In accordance with the process of the invention, pigment-laden seeds are contacted with water containing one or more alpha-enzymes for a period of time and at a concentration sufficient to extract the pigment therefrom. The seeds are then separated from the aqueous dispersion of the pigment which is subsequently recovered from its aqueous environment. Thus, bixa seeds are contacted with an aqueous solution of an alpha-enzyme to extract the annatto pigment.

One of the advantages of the invention is that annatto can be extracted from the seeds in very high yield. Furthermore, the extraction procedure is simple; after contacting the seeds with water and the enzyme, two physical separation steps are all that may be necessary to secure the dye. Thus, the instant invention avoids neutralization and distillation procedures found in the prior art methods.

Another advantage of the invention is that Lipstick Pod seed, after extraction of pigment therefrom can be used directly as an animal or poultry feed. Since alkali is not used in the process of the invention, the seed need not be neutralized with acid prior to its use as feed.

Another advantage of the invention is that only very small quantities of an alpha-enzyme are necessary to produce the benefit of the invention. Thus, expenses for the processor are kept at a minimum and the process is equally suitable for industrial use or farm level processing. Furthermore, dangers inherent in alkaline or solvent extraction are avoided in the instant process; the only extraction medium is water containing a small amount of enzyme, which is safe for humans, other animals, and the environment.

DESCRIPTION OF THE PREFERRED EMBODIMENTS

As mentioned above, in the process of the invention seeds from which pigment is to be extracted are contacted with water containing one or more alpha-enzymes. This class of enzymes consists of those enzymes which are capable of hydrolyzing interior, generally, 1,4-polysaccharide linkages which are spatially alpha oriented. The following description is directed to application of the invention to seeds from the fruit of the Lipstick Pod plant (bixa seeds). This direction is by way of illustration only and should not be construed as a limitation of the scope of the invention. In its broad ambit the invention may be applied to any pigment-containing seed.

In the process of the invention bixa seeds are contacted with water and one or more alpha-enzymes. The proportion of water is generally about 0.5 to 15 parts per part of bixa seed. Enzyme is incorporated into the water in an amount of about 0.01 to 0.0001 parts per part of bixa seed. Preferably, the mixture is agitated, i.e., shaken, stirred, etc., during the period in which contact is maintained between the bixa seed and the water containing the enzyme. Agitation may be vigorous but should not be so vigorous as to cause the seeds to break or the seed coat to be removed. Usually, the period of contact between the bixa seed and the enzyme solution is about 1 to 20 hours. The temperature of the mixture should be about 10° to 70° C. during this period.

The extraction can be conducted at the natural pH of the bixa seed, i.e., about 6.0. However, the preferred pH is that at which the enzyme is most active. At the latter pH a greater yield of pigment can be obtained from the bixa seed. Thus, the pH of the extraction medium can be about 3.5 to 7.5.

As the alpha-enzyme one may employ a polygalacturonase, i.e., an enzyme that catalyzes the hydrolysis of glycosidic linkages of polymerized galacturonic acids, such as those found in pectic acid, pectin, etc.; an alpha-amylase, i.e., an enzyme or group of enzymes that hydrolze the interior alpha-1,4-linkages of starch, etc., pectin transeliminases, pectic acid transeliminases, and the like.

After the extraction of annatto is completed, the seeds are separated from the mixture. This separation may be accomplished according to conventional techniques. Thus, the mixture can be passed through screening of appropriate mesh, which will retain the seeds and allow the water and annatto to pass therethrough. Alternatively, the seeds can be separated from the remaining mixture by decantation or the like. Other methods for removing the seeds will be obvious to those skilled in the art.

Once the seeds are recovered from the mixture, the only task remaining is to separate the annatto from the aqueous dispersion. Various approaches to this problem will be apparent to the skilled artisan. The annatto can be collected by filtration, decantation, or the like, since it is in a solidified form. Another approach is to treat the aqueous dispersion with dilute alkali, such as sodium or potassium hydroxide and the like, to dissolve the annatto. The alkaline solution is filtered and then neutralized by addition of an acid, such as a mineral acid, to reprecipitate the purified annatto. The latter method of isolating the annatto pigment yields a product with less impurities than the former methods. Annatto isolated by any of the above methods can be purified by known techniques to meet the standards required for its intended use.

It is within the compass of the invention to employ papain to aid coagulation of annatto in the mixture obtained after extraction of the pigment is complete but prior to separation of annatto from the enzymatic solution. After extraction, the annatto is dispersed throughout the aqueous medium in fine particles. When papain is added to the mixture these particles coagulate, thus enhancing the effectiveness of the separation of annatto from the solution by decantation, filtration, centrifugation, and the like. The above embodiment may be practiced either before or after the annatto seeds are removed from the enzymatic solution.

EXAMPLES

The invention is further demonstrated by the following illustrative examples.

EXAMPLE 1

Bixa seeds (36 seeds, approximately 2.5 g), harvested one day earlier near San Isidro, Costa Rica, were placed in a 250 ml flask with 60 ml of water and 0.1 g of Spark-L (a pectinase produced by Miles Laboratories, Elkhart, Ind., containing polygalacturonase and pectinesterase). The flask was stirred occasionally over a period of 18 hours at ambient temperature (22°-25° C.). The contents of the flask had a good odor with no indication of fermentation having occurred. The aqueous dispersion of the annatto was decanted from the seeds.

As a control, the procedure described above was repeated without addition of enzyme. The results are summarized in the following table.

The percentage of pigment extracted was determined by visual observation and comparison of the seeds after treatment.

| Treatment | Removal of Pigment From Seed (%) |
|---|---|
| Water & pectinase | 70 |
| Water (control)* | 10 |

*Not in accordance with the invention but provided for purposes of comparison.

EXAMPLE 2

Bixa seeds (3.43 g) from Florida were placed in a 125 ml flask with 50 ml of water and 0.2 g of Pectinol 5-B (a polygalacturonase and pectinesterase mixture supplied by Rohm and Haas Co., Philadelphia, Penn.). The pH of the mixture was adjusted to 5.5 by addition of a citric acid and phosphate buffer. The flask was agitated (swirled at 150 rmp) for a period of 15 hours at a temperature of 50° C. and periodically observed. The aqueous dispersion of annatto was decanted from the seeds. The percentage of pigment extracted was determined by visual comparison and ranking of the seeds after treatment.

The above procedure was followed using different enzymes at different pH values.

As a control, the procedure described above was repeated without addition of enzyme.

The results of all the experiments are summarized in the following table. The enzymes employed were A —Pectinol 5-B, polygalacturonase and pectinesterase mixture supplied by Rohm and Haas Co., Philadelphia, Penn.

B —Brew(N)zyme-MP, alpha-amylase with small amount of protease and beta-amylase supplied by Miles Laboratories, Inc., Marschall Div., Elkhart, Ind.

C —Spark-L-1500, polygalacturonase and pectinesterase with small amounts of proteinase, hemicellulase, and cellulase supplied by Miles Laboratories.

D —Same as A.

E —Same as C.

G —Rhozyme HP-150, hemicellulase produced by Rohm and Haas Co.

H —Cellulase 4000, cellulose produced by Miles Laboratories, Inc.

I —Protease 201-P, proteinase produced by GB Fermentation Industries, Inc., Des Plaines, Ill.

J —Diazyme L-100, glucoamylase produced by Miles Laboratories, Inc.

K —Same as G.

L —Same as J.

M —Papain No. 3375, papain produced by Sigma Chemical Co., St. Louis, Mo.

| Run | Enzyme (predominant active constituent) | Amount (g) | T (°C.) | pH | Removal of pigment from seed (%) |
|---|---|---|---|---|---|
| A | polygalacturonase | 0.2 | 50 | 5.5 | 90 |

-continued

| Run | Enzyme (predominant active constituent) | Amount (g) | T (°C.) | pH | Removal of pigment from seed (%) |
|---|---|---|---|---|---|
| B | alpha-amylase | 0.2 | 50 | 6.4 | 60 |
| C | pectinase | 1.0 | 50 | 5.5 | 50 |
| D | polygalacturonase | 0.2 | 50 | 6.1 | 30 |
| E | pectinase | 1.0 | 50 | 6.1 | 10 |
| F | water (control) | — | 50 | 6.1 | 3 |
| G | hemicellulase | 0.2 | 50 | 6.4 | 3 |
| H | cellulase | 0.2 | 50 | 4.3 | 3 |
| I | proteinase | 0.2 | 50 | 6.4 | 3 |
| J | glucoamylase | 1.0 | 50 | 6.1 | 3 |
| K | hemicellulase | 0.2 | 50 | 6.1 | 3 |
| L | glucoamylase | 1.0 | 50 | 4.3 | 0 |
| M | papain | 0.2 | 50 | 6.4 | 0 |

EXAMPLE 3

The procedure described above in Example 2 was followed with the following changes: temperature, 35° C.; agitation, 300 rpm (swirl) at a flask angle of 10° from horizontal; weight of seeds, 3.03 g; volume of water, 25 ml. The results are tabulated below.

The enzymes employed were
N —Same as A of Example 2.
O —Same as B of Example 2.
P —Same as C of Example 2.
Q —Same as N above.
R —Same as N above.
S —Same as O above.
T —Same as P above.

| Run | Enzyme (predominant active constituent) | Amount (g) | T (°C.) | pH | Removal of pigment from seed (%) |
|---|---|---|---|---|---|
| N | polygalacturonase | 0.2 | 35 | 5.4 | 90 |
| O | alpha-amylase | 0.2 | 35 | 5.4 | 90 |
| P | pectinase | 1.0 | 35 | 5.4 | 90 |
| Q | polygalacturonase | 0.2 | 35 | 5.4 | 70 |
| R | polygalacturonase | 0.2 | 35 | 6.1 | 70 |
| S | alpha-amylase | 0.2 | 35 | 6.1 | 70 |
| T | pectinase | 1.0 | 35 | 6.1 | 70 |
| U | water (control) | — | 35 | 5.4 | 12 |
| V | water (control) | — | 35 | 6.1 | 15 |

EXAMPLE 4

The procedure described in Example 3, Run N, was repeated. The mixture obtained after 15 hours was decanted from the bixa seeds and was divided into two parts. To one part 0.2 g of papain was added. Nothing was added to the other part.

The papain-treated part exhibited enhanced coagulation of annatto pigment allowing decantation of the solution within 20 minutes. The untreated part, on the other hand, did not exhibit coagulation of the precipitated annatto after 48 hours. The supernatant of the papain-treated mixture was clear and pale yellow, whereas that of the non-papain-treated mixture was opaque and dense red in color.

Having thus described my invention, I claim:

1. A process for extracting pigment from seeds containing the same, which comprises contacting the seeds with water containing about 0.01 to 0.0001 parts per part of seeds of an alpha-enzyme selected from the group consisting of polygalacturonases, pectinases, alpha-amylases, pectic acid transeliminases, and pectin transeliminases for a period of time of about 1-20 hours and at a temperature of about 10°-70° C. and a pH of about 3.75-7.5.

2. The process of claim 1 which further comprises separating an aqueous dispersion containing the pigment from the seeds.

3. The process of claim 2 which further comprises separating the pigment from the aqueous dispersion.

4. The process of claim 1 which further comprises adding papain to the water after extraction of the pigment from the seeds.

5. The process of claim 1 wherein the seeds are from the plant *Bixa orellana* L.

6. A process for extracting pigment from seeds of *Bixa orellana* L., which comprises contacting the seeds with water containing about 0.01 to 0.0001 parts per part of seeds of an alpha-enzyme selected from the group consisting of polygalacturonases, pectinases, alpha-amylases, pectic acid transeliminases, and pectin transeliminases for a period of about 1-20 hours and at a temperature of about 10°-70° C. and a pH of about b 3.5-7.5.

7. The process of claim 6 which further comprises separating an aqueous dispersion containing the pigment from the seeds.

8. The process of claim 7 which further comprises separating the pigment from the aqueous dispersion.

9. The process of claim 6 which further comprises adding papain to the water after extraction of the pigment from the seeds.

* * * * *